United States Patent
Nagge

(10) Patent No.: US 11,185,798 B2
(45) Date of Patent: Nov. 30, 2021

(54) DUAL CHAMBER HORIZONTAL VESSEL

(71) Applicant: DYNACORP FABRICATORS INC., Calgary (CA)

(72) Inventor: Rory Nagge, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 347 days.

(21) Appl. No.: 15/809,101

(22) Filed: Nov. 10, 2017

(65) Prior Publication Data

US 2018/0133623 A1 May 17, 2018

Related U.S. Application Data

(60) Provisional application No. 62/421,570, filed on Nov. 14, 2016.

(51) Int. Cl.
*B01D 21/00* (2006.01)
*B01D 21/24* (2006.01)

(52) U.S. Cl.
CPC ....... *B01D 21/0042* (2013.01); *B01D 21/003* (2013.01); *B01D 21/0012* (2013.01); *B01D 21/0024* (2013.01); *B01D 21/0036* (2013.01); *B01D 21/2427* (2013.01)

(58) Field of Classification Search
CPC ............ B01D 21/0012; B01D 21/0024; B01D 21/003; B01D 21/0036; B01D 21/0042; B01D 21/2427
See application file for complete search history.

(56) References Cited

U.S. PATENT DOCUMENTS

| | | | |
|---|---|---|---|
| 3,349,547 A | 10/1967 | Hoipkemeier | |
| 4,617,031 A * | 10/1986 | Suh | B01D 45/02 95/243 |
| 5,919,284 A * | 7/1999 | Perry, Jr. | B01D 45/02 95/19 |
| 7,014,685 B2 * | 3/2006 | Burns | B01D 29/114 55/356 |
| 8,454,843 B2 * | 6/2013 | Brown | B01D 21/245 210/803 |
| 2013/0134109 A1* | 5/2013 | Tweit | B01D 21/0042 210/803 |
| 2015/0292313 A1* | 10/2015 | Morin | E21B 43/34 166/267 |

OTHER PUBLICATIONS

Guillaume White-Rolland, Canadian Office Action dated Sep. 26, 2019, CA Application No. 2,985,233, pp. 1-3.

* cited by examiner

*Primary Examiner* — Dirk R Bass
(74) *Attorney, Agent, or Firm* — MH2 Technology Law Group LLP

(57) ABSTRACT

The present disclosure relates to a device for removing particulates, such as sand, from a fluid at an oil and/or gas wellsite. In one aspect, a vessel for separating particulates from a fluid is provided. The vessel includes a body having an inlet and an outlet. The vessel also includes a first chamber and a second chamber disposed in the body. The vessel further includes a screen configured to separate particulates from the fluid. The screen is disposed in the second chamber. Additionally, the vessel includes a vessel door for inserting and removing the screen from the second chamber. In another aspect, a pressure vessel for separating particulates from a fluid is provided. In yet a further aspect, a method of separating particulates from a fluid is provided.

23 Claims, 4 Drawing Sheets

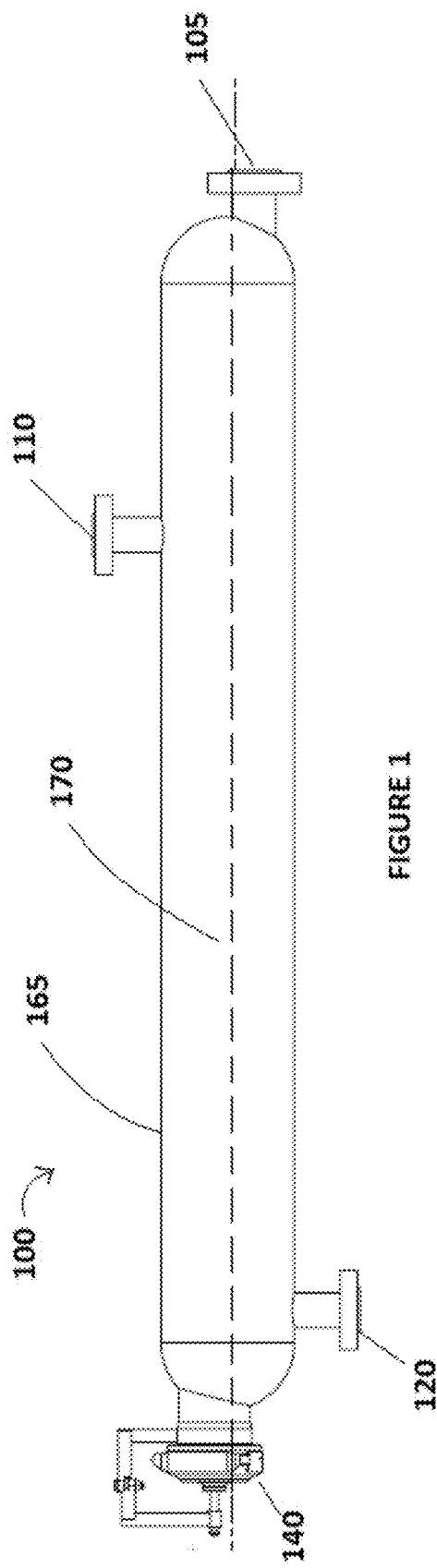
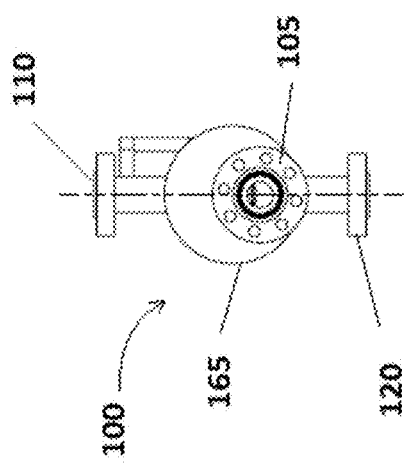
FIGURE 1
FIGURE 2

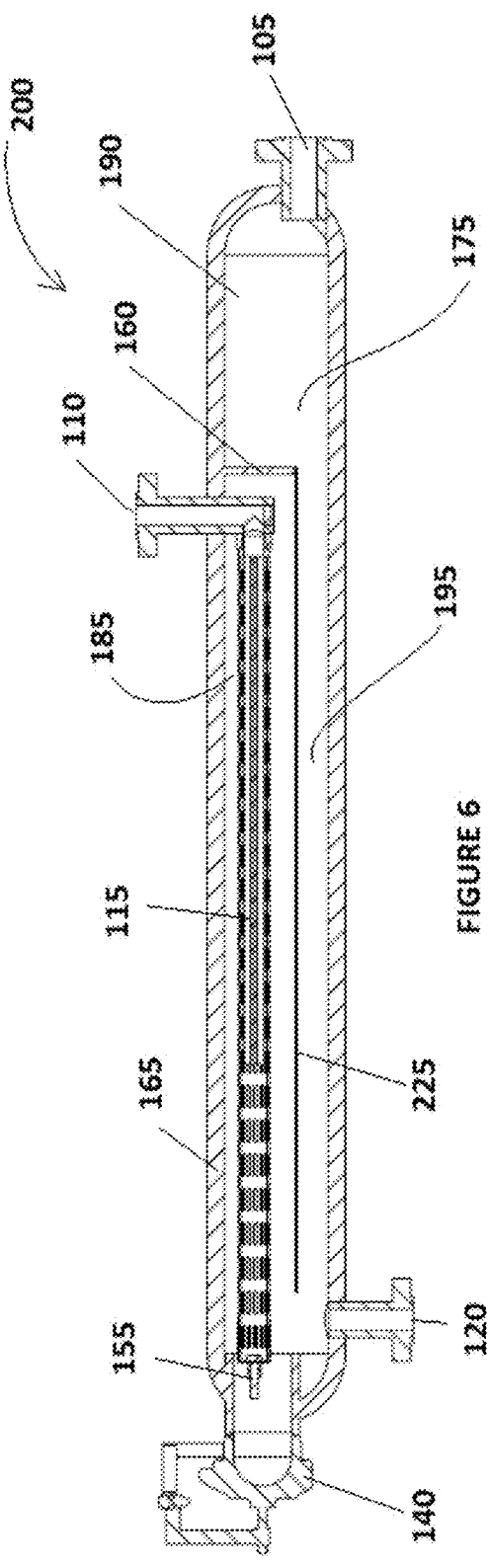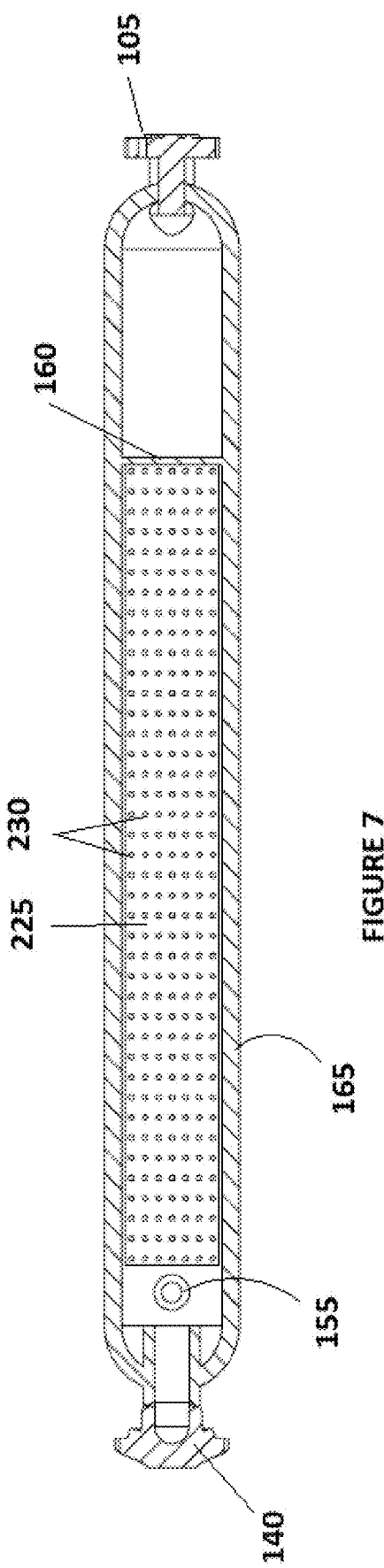

DUAL CHAMBER HORIZONTAL VESSEL

CROSS-REFERENCE TO RELATED APPLICATIONS

This application claims priority to U.S. Provisional Patent Application having Ser. No. 62/421,570, which was filed on Nov. 14, 2016, which is incorporated herein by reference.

BACKGROUND

Pressure vessels having an inlet and outlet have been used for a variety of purposes. Many of these pressure vessels are operated in a position whereby the axis of the pressure vessel is orientated generally horizontally with respect to ground level.

Pressure vessels are frequently used in the oil and gas industry whereby the pressure vessels can be used to separate particulates, such as sand and/or other solids, from fluid (e. g., hydrocarbons) that comes from a wellhead.

In many cases in order to effectively remove the particulates from the fluids, the particulates must have sufficient time to drop out of the fluid. In some cases the pressure vessel has to be made into one very long chamber which adds material cost to the fabrication. Alternatively, the pressure vessel can instead include two pressure vessels disposed generally parallel to each other and connected at one end thereof so that the pressure vessel does not have an inordinately large footprint which would otherwise make it difficult to transport or assemble.

There is a need for an improved pressure vessel. Further, there is a need for a pressure vessel having a smaller footprint than previously used. Additionally, there is a need for a pressure vessel that is easier to construct and assemble in a desired location.

SUMMARY

The present disclosure relates to a device for removing particulates, such as sand, from a fluid at an oil and/or gas wellsite. In one aspect, a vessel for separating particulates from a fluid is provided. The vessel includes a body having an inlet and an outlet. The vessel also includes a first chamber and a second chamber disposed in the body. The vessel further includes a screen configured to separate particulates from the fluid. The screen is disposed in the second chamber. Additionally, the vessel includes a vessel door for inserting and removing the screen from the second chamber.

In another aspect, a pressure vessel for separating particulates from a fluid is provided. The pressure vessel includes a pressure vessel body having a first end and a second end. The pressure vessel also includes a first chamber in fluid communication with an inlet of the pressure vessel body. The pressure vessel further includes a second chamber in fluid communication with an outlet of the pressure vessel body. Additionally, the pressure vessel includes a screen disposed within the pressure vessel between the inlet and the outlet. Further, the pressure vessel includes a plurality of separation baffles configured to separate a portion of the first chamber from a portion of the second chamber.

In yet a further aspect, a method of separating particulates from a fluid is provided. The method includes the step of placing a pressure vessel in communication with the fluid. The pressure vessel having a first chamber and a second chamber that are partially separated at least one separation baffle. The method also includes the step of removing a first portion of the particulates from the fluid in the first chamber. The method further includes the step of removing a second portion of the particulates from the fluid in the second chamber.

The foregoing summary is intended merely to introduce some aspects of the following disclosure and is thus not intended to be exhaustive, identify key features, or in any way limit the disclosure or the appended claims.

BRIEF DESCRIPTION OF THE DRAWINGS

The present disclosure may best be understood by referring to the following description and accompanying drawings that are used to illustrate embodiments of the invention. In the drawings:

FIG. 1 illustrates a view of a dual chamber horizontal pressure vessel, according to one embodiment.

FIG. 2 illustrates an end view of the dual chamber horizontal pressure vessel.

FIG. 6 illustrates a cross-sectional side view of a dual chamber horizontal pressure vessel, according to one embodiment.

FIG. 7 illustrates a cross-sectional top view of the dual chamber horizontal pressure vessel.

DETAILED DESCRIPTION

Figure 3:
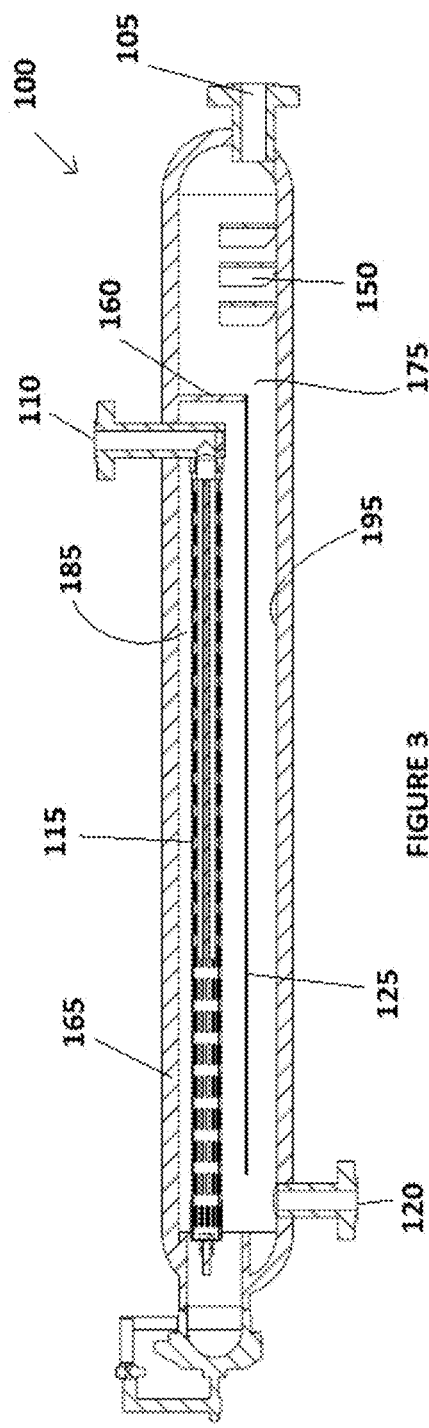
FIG. 3 illustrates a cross-sectional side view of the dual chamber horizontal pressure vessel.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Previous dual horizontal vessel screens included a lower vessel to allow large particles to drop out and collect before travelling to an upper vessel where smaller particles where filtered out by a screen. One large vessel with a separation baffle separating a first chamber and a second chamber would provide the same benefits as the dual horizontal vessel screens with increased dwell time and larger collection areas.

Referring now to the figures, FIG. 1 illustrates a view of a dual chamber horizontal pressure vessel 100. Generally, the pressure vessel 100 is configured to separate particulates from a fluid. The pressure vessel 100 includes a pressure vessel body 165, an inlet 105, an outlet 110 and a blow down valve 120. As will be described herein, a fluid with particulates enters into the inlet 105 of the pressure vessel 100 and a clean fluid (with substantially no particulates) exits the outlet 110 of the pressure vessel 100. As shown, the pressure vessel 100 further includes a vessel door 140.

FIG. 2 illustrates an end view of the pressure vessel 100. As shown in FIGS. 1 and 2, the inlet 105 is offset from a longitudinal axis 170 of the pressure vessel 100. In another embodiment, the inlet 105 is substantially in-line with the longitudinal axis 170 of the pressure vessel 100.

FIG. 3 illustrates a cross-sectional side view of the pressure vessel 100. As shown, the pressure vessel 100 includes a first chamber 175 and a second chamber 185. The first chamber 175 is connected to the inlet 105 and the second chamber 185 is connected to the outlet 110. The first and second chambers 175, 185 are separated by a first separation baffle 125 and a second separation baffle 160. In one embodiment, a longitudinal axis of the first separation baffle 125 is substantially parallel to the longitudinal axis 170 of the pressure vessel 100 and a longitudinal axis of the second separation baffle 160 is substantially perpendicular to the longitudinal axis 170 of the pressure vessel 100.

The first and second chambers 175, 185 extend along the longitudinal axis 170 of the pressure vessel 100. In the embodiment shown, the second chamber 185 is disposed above the first chamber 175. In another embodiment, the second chamber 185 may be disposed below the first chamber 175.

The first chamber 175 of the pressure vessel 100 includes at least one inlet baffle 150 positioned proximate the inlet 105. The inlet baffle 150 is configured to agitate the fluid entering the inlet 105. The first chamber 175 further includes a particulate collection portion 195 that is configured to receive the particulates that are removed from the fluid entering the inlet 105.

The second chamber 185 of the pressure vessel 100 includes a screen 115. The screen 115 may include a screen handle 155 at one end of the screen 115. In one embodiment, the screen 115 is a wire wrapped slotted screen. An example of a wire wrapped slotted screen may be found in U.S. Pat. No. 9,759,057, which is incorporated herein by reference.

Figure 4:
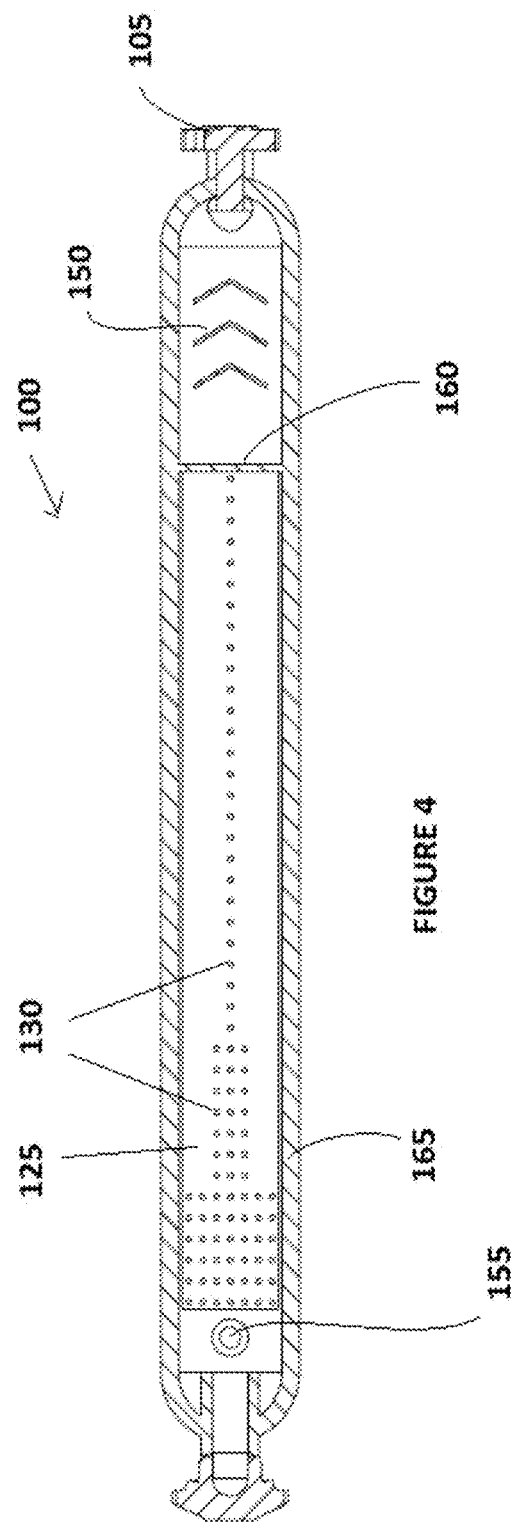
FIG. 4 illustrates a cross-sectional top view of the dual chamber horizontal pressure vessel.

FIG. 4 illustrates a cross-sectional top view of the dual chamber horizontal pressure vessel 100. As shown, the first separation baffle 125 may include a plurality of ports 130. The ports 130 may be configured to allow fluid traveling between the chambers 175, 185. For instance, the ports 130 may be configured to allow the upper most and cleanest fluid traveling through the first chamber 175 to move into the second chamber 185 without traveling around the end of the separation baffle 125.

The ports 130 may be configured to initially allow the uppermost buoyant gaseous phase of the fluid to pass through to the second chamber 185 first. The gaseous phase of the fluid (due to the low viscosity and density) does not carry particulates well, as such, the gaseous phase of the fluid is typically the cleanest phase and often the most voluminous phase of the fluid. The ability of the gaseous phase of the fluid to pass into the second chamber 185 through the ports 130 helps to slow down the remaining liquid flow and provide more dwell time for particulates to drop due to gravity from the liquid flow and deposit into the particulate collection portion 195 in the first chamber 175. As the fluid flows along the first chamber 175 particulates fall into the particulate collection portion 195. Once all the gas has escaped up into the second chamber 185 any fluid that begins to pass though the ports 130 will be the cleanest fluid and will give the remaining dirty fluid more time to separate the particulates from the fluid flow.

The ports 130 may have a configuration as shown in FIG. 4 in which there are larger number of ports 130 at the end near the vessel door 140 as compared to the number of ports 130 near the outlet 110 to continually decrease horizontal travel speed of the remaining dirty fluid. As also shown in FIG. 4, the inlet baffles 150 may be bent at an angle to allow the baffles 150 to stir up (or agitate) the fluid with particulates entering the inlet 105.

Figure 5:
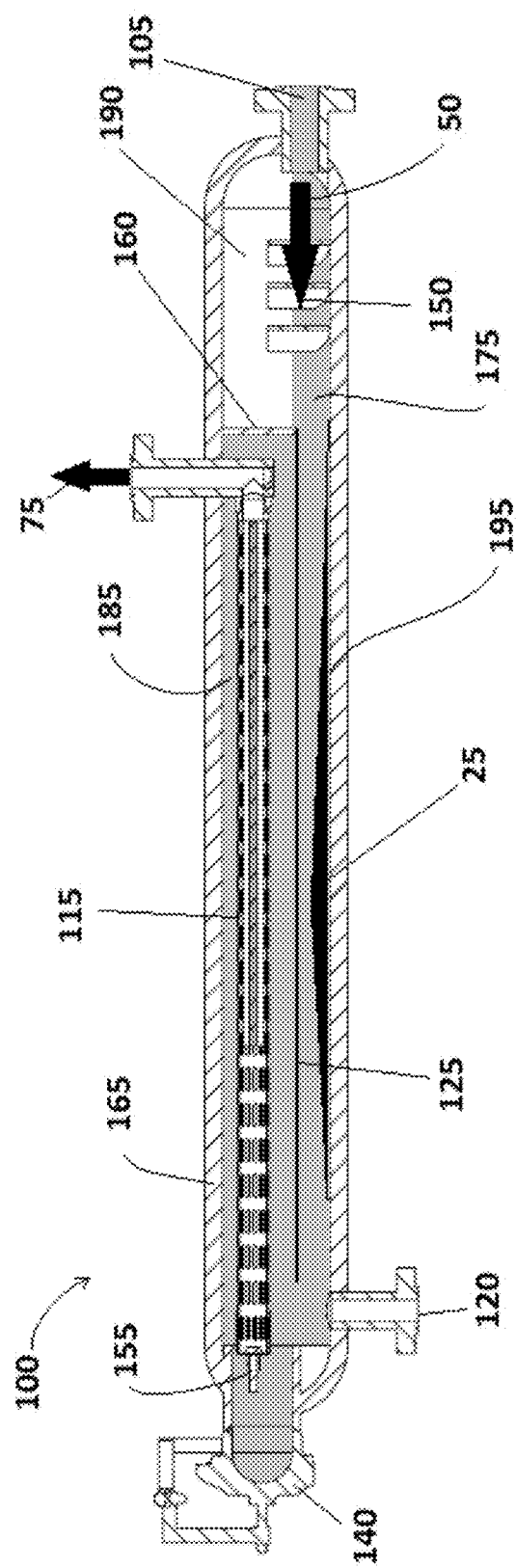
FIG. 5 illustrates a cross-sectional view of the dual chamber horizontal pressure vessel.

FIG. 5 illustrates a cross-sectional view of the dual chamber horizontal pressure vessel 100. During operation of the vessel 100, fluid (with particulates) enters the inlet 105 and flows into the gas lock volume 190. The liquid phase of the fluid flow follows a gravity driven trajectory and falls through the gas in the gas lock volume 190 and into the liquid below. This agitates the liquid portion of the fluid and helps it to briefly separate into droplets and disrupts the laminar flow which helps knock particulates out of the liquid portion of the fluid. The gas portion of the fluid takes a more horizontal path and flows out the nozzle of the inlet 105 and flows around in the gas lock volume 190. This causes nearly all of the particulates (e.g., sand) to fall out of the gas portion and into the liquid portion below. As shown, a portion of the particulates 25 in the fluid are deposited in the particulate collection portion 195 in the first chamber 175. The fluid moves through the first chamber 175 around the separation baffle 125 and enters into the second chamber 185. The fluid entering the second chamber 185 moves through the screen 115 to remove additional particulates. Some of the particulates from the screen 115 may fall through the ports 130 of the separation baffle 125 into the particulate collection portion 195 in the first chamber 175 and the remaining particulates stay in the screen 115. The fluid moving through the screen 115 exits the outlet 110 of the pressure vessel 100 as a clean fluid as indicated by arrow 75.

The pressure vessel 100 may need to be cleaned when the screen 115 and the particulate collection portion 195 are filled with particulates. During the cleaning operation, an operator will shut down flow into and out of the pressure vessel 100 and trap pressure inside the pressure vessel 100. The operator may then open the blow down valve 120 blowing out all sand and water to a choke line (not shown). The choke line relieves pressure and blows all fluids and contaminates into a blowdown vessel (not shown). The blowdown vessel will hold the contaminants until a blowout vacuum truck can come by to clean it out. Once the pressure vessel 100 has blown out, the operator shuts the blow down valve 120 and can re-open upstream and downstream valves to continue processing fluid. This is a quick and effective clean out processes to clean out the pressure vessel 100 with minimal down time.

If the pressure vessel 100 is dealing with large particulates, or there is not enough pressure to blow out the particulates from the pressure vessel 100, the operator can open the vessel door 140 and remove the screen 115 from the pressure vessel 100 by using the screen handle 155. The screen 115 may be cleaned and/or replaced. The operator may also manually clean out the pressure vessel 100 with a plastic scrapper tool (not shown). This can take more time than blowing out the pressure vessel 100 but it can be more effective when the particulates are a heavy or a larger grade of material.

FIG. 6 illustrates a cross-sectional side view of a dual chamber horizontal pressure vessel 200, according to one embodiment. For convenience, the components in the pressure vessel 200 that are similar to the pressure vessel 100 will be labeled with the same reference character. As shown, the pressure vessel 200 includes the pressure vessel body 165, the inlet 105 and the outlet 110. The pressure vessel 200 further includes the first chamber 175 with the particulate collection portion 195 and the second chamber 185 with the screen 115. The first and second chambers 175, 185 are separated by a first separation baffle 225 and the second separation baffle 160. The separation baffle 225 may have a plurality of ports 230 may be configured to allow fluid and/or particulates to travel between the first chamber 175 and the second chamber 185 without traveling around the end of the separation baffle 225. Generally, the pressure vessel 200 is configured to separate particulates from a fluid.

During operation of the vessel 200, fluid (with particulates) enters the inlet 105 and flows into the gas lock volume 190. The liquid phase of the fluid flow follows a gravity driven trajectory and falls through the gas in the gas lock volume 190 and into the liquid below. This agitates the liquid portion of the fluid and helps it to briefly separate into droplets and disrupts the laminar flow which helps knock particulates out of the liquid portion of the fluid. The gas portion of the fluid takes a more horizontal path and flows out the nozzle of the inlet 105 and flows around in the gas lock volume 190. This causes nearly all of the particulates (e.g., sand) to fall out of the gas portion and into the liquid portion below. A portion of the particulates in the fluid are deposited in the particulate collection portion 195 in the first chamber 175. The fluid moves through the first chamber 175 around the separation baffle 225 and enters into the second chamber 185. The fluid entering the second chamber 185 moves through the screen 115 to remove additional particulates. Some of the particulates from the screen 115 may fall through a plurality of ports 230 of the separation baffle 225 into the particulate collection portion 195 in the first chamber 175 and the remaining particulates may stay in the screen 115. The fluid moving through the screen 115 exits the outlet 110 of the pressure vessel 200 as a clean fluid. FIG. 7 illustrates a cross-sectional top view of the dual chamber horizontal pressure vessel 200. As shown, the ports 230 have a consistent pattern along the length of the separation baffle 225.

In one embodiment, the vessel 100, 200 may include a hydrate breaker (not shown) disposed proximate the outlet 110 in the second chamber 185. The hydrate breaker functions to break out any ice or larger particulates found in the fluid. In one embodiment the hydrate breaker comprises a perforated plate steel.

In one embodiment a plurality of second baffles (not shown) may be used in the pressure vessel 100, 200. The second baffles may be disposed at an angle which assists to break up any vortices presented by the incoming fluid; and thereby assist to direct any sand or particulates to "fall" to the bottom, or lower region or first chamber 175 of the pressure vessel 100, 200. Each of the second baffles may include a straight portion and an angled portion which assists in directing the particulates in the fluid stream entering the inlet 105 to the bottom of the pressure vessel 100, 200.

In one embodiment, the pressure vessel 100, 200 may include a removable tray (not shown). The tray may be placed in the first chamber 175 to catch particulates in the fluid. The tray may include a handle at one end to assist in the removal of the tray from the pressure vessel 100, 200. The tray may be configured to be removed and/or replaced by opening the vessel door 140.

In one aspect, a method is provided for separating sand from a hydrocarbon fluid between an inlet and an outlet of a horizontal pressure vessel by (a) partitioning the interior of the horizontal pressure vessel to define a first chamber and second chamber, a first chamber communicating with the second chamber and inlet, second chamber communicating with the first chamber and the outlet; (b) removing a portion of sand from the hydrocarbon fluid in the first chamber; (c) removing a second portion of the sand from the hydrocarbon fluid in the second chamber with a screen disposed in the second chamber.

The method as described herein also includes removably placing a tray within the first chamber to collect and dispose of the portion of the sand from the hydrocarbon in the first chamber.

In another embodiment the method includes removably placing the screen into the second chamber.

In another aspect, a horizontal vessel is provided that includes an inlet and outlet for separating particulates from a fluid comprising: dual chambers disposed within the vessel wherein one of the chambers includes a tray for collecting the particulates; and enclosure for inserting and removing the tray from one of the chambers.

In one embodiment the horizontal vessel includes baffle disposed in the other chamber in the vicinity of the inlet. In another embodiment the horizontal vessel includes a second baffle structure disposed in the vicinity of the outlet of the other chamber.

In a further aspect, a horizontal pressure vessel is provided that includes an inlet and outlet for separating solids from a hydrocarbon fluid comprising: a partition disposed within the horizontal pressure vessel so as to define a first and second chamber; where the first and second chambers communicate with one another and the first chamber communicates with the inlet and the second chamber communicates with the outlet.

In one embodiment the partition comprises a baffle plate disposed generally horizontally within the horizontal pressure vessel and includes a plurality of perforated holes disposed at one end of the baffle plate in the vicinity of the outlet. In another embodiment the horizontal pressure vessel includes a screen carried by the baffle plate where the screen is disposed in the second chamber. In a further embodiment, the screen comprises a hollow cylinder extending longitudinally thereof so as to present a cylindrical surface having a plurality of slots disposed along the cylindrical surface, and at least one supporting plate disposed within the hollow cylinder to strengthen the screen. In yet another embodiment, a tray is disposed in the first cylinder to collect a portion of solids.

It is yet another aspect, a method is provided for separating sand and other solids from a hydrocarbon fluid between an inlet and outlet of a horizontal pressure vessel by: partitioning the interior of the horizontal pressure vessel to define a first chamber and a second chamber; the first chamber communicating with the second chamber and inlet; the second chamber communicating with the first chamber and outlet; removing a portion of the sand and other solids from the hydrocarbon fluid in the first chamber; removing a second portion of sand and other solids from the hydrocarbon fluid in the second chamber with a screen disposed in the second chamber.

In another embodiment, the method includes removably placing a tray within the first chamber to collect and dispose of the portion of the sand from the hydrocarbon fluid in the first chamber. In another embodiment, the method includes removably placing the screen in the second chamber, the screen having a circumferentially wound wire screen at one end of the screen and a plurality of slots circumferentially disposed between the wire screen and the other end of the screen. In yet another embodiment, the method includes placing the screen with one end having a circumferentially wound wire adjacent to the outlet.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vessel for separating particulates from a fluid, the vessel comprising:
   a cylindrical body having an inlet and an outlet;
   a first chamber and a second chamber disposed in the body;
   a first separation baffle and a second separation baffle disposed in the body and at least partially separating the first chamber and the second chamber, the first and second separation baffles intersecting so as to prevent fluid flow therebetween;
   a screen comprising a cylindrical member having a central axis that extends parallel to a central longitudinal axis of the cylindrical body, the screen configured to separate particulates from the fluid, the screen being disposed in the second chamber; and
   a vessel door for inserting and removing the screen from the second chamber,
   wherein the first separation baffle extends parallel to the central axis of the screen from a first position proximal to the vessel door to a second position distal from the vessel door, the second position being between the inlet and the outlet and between the inlet and the screen, and wherein the first and second separation baffles intersect at the second position, and wherein the first separation baffle extends along at least a majority of an axial length of the screen.

2. The vessel of claim 1, wherein first chamber is disposed in the body proximate the inlet and the second chamber is disposed in the body proximate the outlet.

3. The vessel of claim 1, wherein the second separation baffle is disposed at least partially in the first chamber near the inlet.

4. The vessel of claim 1, wherein the first separation baffle includes a plurality of ports configured to allow fluid communication between the first and second chambers through the first separation baffle.

5. The vessel of claim 1, wherein the first chamber includes a gas lock portion proximate the inlet of the body.

6. The vessel of claim 1, wherein the first chamber includes a particulate collection portion configured to receive particulates removed from the fluid.

7. The vessel of claim 1, further comprising a tray disposed in the first chamber, the tray being configured to collect the particulates from the fluid.

8. The vessel of claim 1, wherein the cylindrical body is disposed in a horizontal orientation.

9. The vessel of claim 1, wherein the first separation baffle extends along a longitudinal axis of the body, wherein the second separation baffle extends transverse to the longitudinal axis, wherein the second separation baffle is positioned between the inlet and the screen, and wherein the screen is positioned between the outlet and the first separation baffle.

10. The vessel of claim 9, wherein the second separation baffle forces fluid to flow under the first separation baffle, and wherein the first separation baffle forces at least a portion of the fluid to flow along the longitudinal axis and around an end of the first separation baffle into the second chamber.

11. The vessel of claim 10, wherein the inlet communicates directly with the first chamber, and wherein the outlet communicates directly with the second chamber.

12. The vessel of claim 1, wherein the second chamber is defined vertically between the first separation baffle and a wall of the cylindrical body.

13. The vessel of claim 1, wherein the first separation baffle is positioned axially in the cylindrical body between the inlet and the outlet, such that fluid must flow around the first separation baffle to reach second chamber from the first chamber.

14. The vessel of claim 1, wherein the screen is configured to move axially in a direction parallel to the first separation baffle into and out of the cylindrical body through the vessel door.

15. The vessel of claim 1, wherein the cylindrical member comprises a wire-wrapped, slotted pipe.

16. A pressure vessel for separating particulates from a fluid, the pressure vessel comprising:
   a cylindrical pressure vessel body defining a central longitudinal axis and having a first end, a second end, an inlet defined proximal to the first end, and an outlet defined axially between the first and second ends;

a first chamber in fluid communication with the inlet of the pressure vessel body;

a second chamber in fluid communication with the outlet of the pressure vessel body;

a screen comprising a wire-wrapped, slotted, cylindrical member defining a central axis disposed within the pressure vessel, the central axis extending parallel to the central longitudinal axis of the cylindrical pressure vessel body; and a first separation baffle and a second separation baffle, the first and second separation baffles positioned in the pressure vessel body and configured to separate a portion of the first chamber from a portion of the second chamber, the first separation baffle extending at least partially in a direction parallel to the central longitudinal axis of the cylindrical pressure body and the central axis of the screen, from a first position proximal to the second end to a second position distal from the second end, the second position being between the inlet and the outlet and between the inlet and the screen, and the second separation baffle extending at least partially in a direction perpendicular to the central axis, the first and second separation baffles intersecting at the second position, whereby the first and second separation baffles prevent fluid flow therebetween, and whereby the first separation baffle extends along at least a majority of an axial length of the screen.

17. The pressure vessel of claim 16, further comprising a vessel door at the second end of the pressure vessel body for inserting and removing the screen from the pressure vessel body.

18. The pressure vessel of claim 16, wherein the first separation baffle includes a port that allows fluid communication between the first chamber and the second chamber.

19. The pressure vessel of claim 16, wherein the inlet and the outlet are positioned proximate the first end of the pressure vessel.

20. The pressure vessel of claim 16, further including a blow down valve movable between an open position and a closed position, wherein the blow down valve is moved to the open position to remove particulates from the pressure vessel body.

21. The pressure vessel of claim 16, wherein the first chamber includes a particulate collection portion configured to receive particulates removed from the fluid.

22. The pressure vessel of claim 21, further comprising a removable tray disposed within the particulate collection portion of the first chamber.

23. A vessel for separating particulates from a fluid, the vessel comprising:

a cylindrical body having an inlet and an outlet;

a first chamber and a second chamber disposed in the body;

a first separation baffle and a second separation baffle disposed in the body and at least partially separating the first chamber and the second chamber, the first and second separation baffles intersecting so as to prevent fluid flow therebetween;

a screen configured to separate particulates from the fluid, the screen being disposed in the second chamber; and a vessel door for inserting and removing the screen from the second chamber, wherein the first separation baffle includes a plurality of ports configured to allow fluid communication between the first and second chambers through the first separation baffle, and wherein a density of the ports increases as proceeding axially in a direction from the inlet toward the outlet.

* * * * *